(12) United States Patent
Chung et al.

(10) Patent No.: US 6,271,977 B1
(45) Date of Patent: Aug. 7, 2001

(54) MULTI-STATE PREAMPLIFIER FOR DISK DRIVES

(75) Inventors: Paul Wingshing Chung, San Jose; Stephen Alan Jove, Watsonville, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/246,990

(22) Filed: Feb. 16, 1999

(51) Int. Cl.$^7$ ........................................ G11B 5/09
(52) U.S. Cl. ................. 360/46; 360/67; 360/66; 360/61; 330/124 R
(58) Field of Search .................... 324/212, 226, 324/207, 21; 360/46, 67, 31, 66, 61, 63, 64; 330/61 R, 62, 259, 252, 270, 290, 51, 124 R, 126

(56) References Cited

U.S. PATENT DOCUMENTS

| | | | |
|---|---|---|---|
| 3,579,042 | * | 5/1971 | Abend ........................... 361/54 |
| 4,628,275 | * | 12/1986 | Skipper et al. ................. 330/10 |
| 5,032,935 | * | 7/1991 | Jove et al. ...................... 360/67 |
| 5,122,915 | * | 6/1992 | Klein et al. .................... 360/67 |
| 5,331,478 | | 7/1994 | Aranovsky . |
| 5,412,518 | | 5/1995 | Christner . |
| 5,444,579 | | 8/1995 | Klein et al. . |
| 5,701,213 | | 12/1997 | Cameron et al. . |
| 5,726,821 | | 3/1998 | Cloke et al. . |
| 5,774,291 | | 6/1998 | Contreras et al. . |
| 5,790,334 | | 8/1998 | Cunningham . |
| 6,101,056 | * | 8/2000 | Klaassen et al. ................ 360/66 |

* cited by examiner

Primary Examiner—Alan T. Faber
(74) Attorney, Agent, or Firm—Noreen A. Krall; Abdy Raissinia

(57) ABSTRACT

A multi-state preamplifier having a first detector and a second detector provides voltage-sensing and current-sensing signal amplification, respectively. Either the first detector or the second detector is selected and switched active at any given time, producing an amplified signal representing either the signal voltage developed across the MR element or the signal current flowing through the MR element, respectively. The switching process to activate either the first detector or the second detector is carried out by a detector determining circuit connected to a disk drive control unit. The detector giving the optimum high frequency bandwidth for the preamplifier is chosen based on the resistance of the MR element coupled with the input interconnect network characteristic and parasitic impedances.

12 Claims, 5 Drawing Sheets

MULTI-STATE PREAMPLIFIER FOR DISK DRIVES

BACKGROUND OF THE INVENTION

1. Field of the Invention

This invention relates in general to a direct access storage device (DASD) of the type utilizing magnetoresistive read sensors for reading signals recorded in a magnetic medium and, more particularly, to a DASD having a novel multi-state preamplifier for increasing the high frequency bandwidth of the read signal channel.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head comprising a read sensor and a write transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

One or more electrical conductors extend over the suspension assembly to electrically connect the read/write transducer to a read/write chip on the actuator arm. A multiline flexible printed circuit cable (actuator flex cable) provides the electrical contact between the read/write chip and the disk drive electronics which are mounted outside the disk drive housing. Inside the disk drive housing, the actuator flex cable connects to an electrical connector pin assembly, which in turn, through an opening or connector port in the housing, connects to the external electronics.

In high capacity disk drives, magnetoresistive read sensors or giant magnetoresistive read sensors, commonly referred to as MR heads and GMR heads, respectively, are the prevailing read sensors because of their capability to read data from a surface of a disk at greater track and linear densities than thin film inductive heads. An MR sensor detects a magnetic field through the change in resistance of its MR sensing layer (also referred to as an "MR element") as a function of the strength and direction of the magnetic flux being sensed by the MR layer.

The changes in resistance of the MR element in response to magnetic data recorded on a disk surface are amplified in the read/write chip (also referred to as the arm electronics (AE) module) on the actuator arm before transmission to the external electronics. The frequency response of the preamplifier in the AE module, and in particular its high frequency bandwidth determines the data rate capability of the disk drive. The high frequency bandwidth of the system comprising the MR element, preamplifier and interconnects is a function of the MR element resistance. MR element resistances generally have a range of values due to manufacturing variations and tolerances. The resistance of a single MR element may also change due to temperature or other conditions in the disk drive during manufacturing and use.

In order to optimize the MR element performance, one approach of the prior art has been to assume a resistance value based on statistical data and to use this value to optimize the operating point of the MR element for optimum performance. Christner et al. in U.S. Pat. No. 5,412,518 disclose a method for controlling the biasing current applied to the MR elements within a disk drive to provide optimized bias current for each head/disk/channel component combination based on measurements of the resistance of each MR element in the disk drive prior to assembly. Contreras et al. in U.S. Pat. No. 5,774,291 disclose a circuit for measuring the MR element resistance after assembly into the disk file for optimizing the MR element's operating point. Klein et al. in U.S. Pat. No. 5,122,915 disclose a preamplifier for an MR sensor that maintains a constant voltage across the MR element and provides a voltage signal output. However gain-bandwidth product limitations exist that are believed due to parasitic capacitances. Klein et al. in U.S. Pat. No. 5,444,579 disclose a preamplifier that uses a current mode amplifier resulting in increased gain-bandwidth product. However, the prior art does not address optimization of the preamplifier bandwidth as a function of MR element resistance.

Therefore, there is a need for an preamplifier that improves the bandwidth of the MR element/preamplifier/inteconnect system and, in particular, optimizes the high frequency bandwidth of the system for a range of resistances of the MR elements.

SUMMARY OF THE INVENTION

It is an object of the present invention to disclose a preamplifier for providing increased high frequency bandwidth and therefore increased data rate capability of the read signal channel of a magnetic disk drive.

It is another object of the present invention to disclose a preamplifier having both a voltage-sense detector and a current-sense detector for optimally detecting a resistance change of an MR element.

It is yet another object of the present invention to disclose a preamplifier having a detector determining circuit for selecting between a voltage-sense detector and a current-sense detector to provide the optimal read channel high frequency bandwidth at any time.

It is a further object of the present invention to provide a method for using a preamplifier and detector determining circuit for improving the high frequency bandwidth of the read channel of a magnetic disk drive.

These and other objects and advantages are attained in accordance with the principles of the present invention by a multi-state preamplifier having a first detector and a second detector to provide voltage-sense and current-sense signal amplification, respectively. Either the first detector or the second detector is selected and switched active at any given time, producing an amplified signal representing either the signal voltage developed across the MR element or the signal current generated through the MR element, respectively. The switching process to activate either the first detector or the second detector is carried out by a detector determining circuit connected to a disk drive signal processor. A common output from the detectors is obtained by multiplexing the individual signal representations from the first detector and the second detector by a summing circuit.

The choice of the optimum detector to activate at any time depends on the resistance value of the MR element coupled with the input interconnect network characteristic and parasitic impedances. These impedances may be modelled or measured after which the system (interconnect, MR element and preamplifier) high frequency bandwidth variation can be determined as a function of the resistance of the MR element and possibly the location (due to the length of interconnect from the preamplifier to the MR element part of the head) of the MR element. In general, for lower resistance MR elements, the voltage-sense detector will yield higher bandwidth, and for higher resistance MR elements, the current-sense detector will yield higher bandwidth.

Several voltages and currents within the first detector and the second detector are proportional to the value of the resistance of the MR element and may be used by the detector determining circuit to select the optimal detector by comparison with a threshold resistance value for switching between voltage-sense and current-sense detectors.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
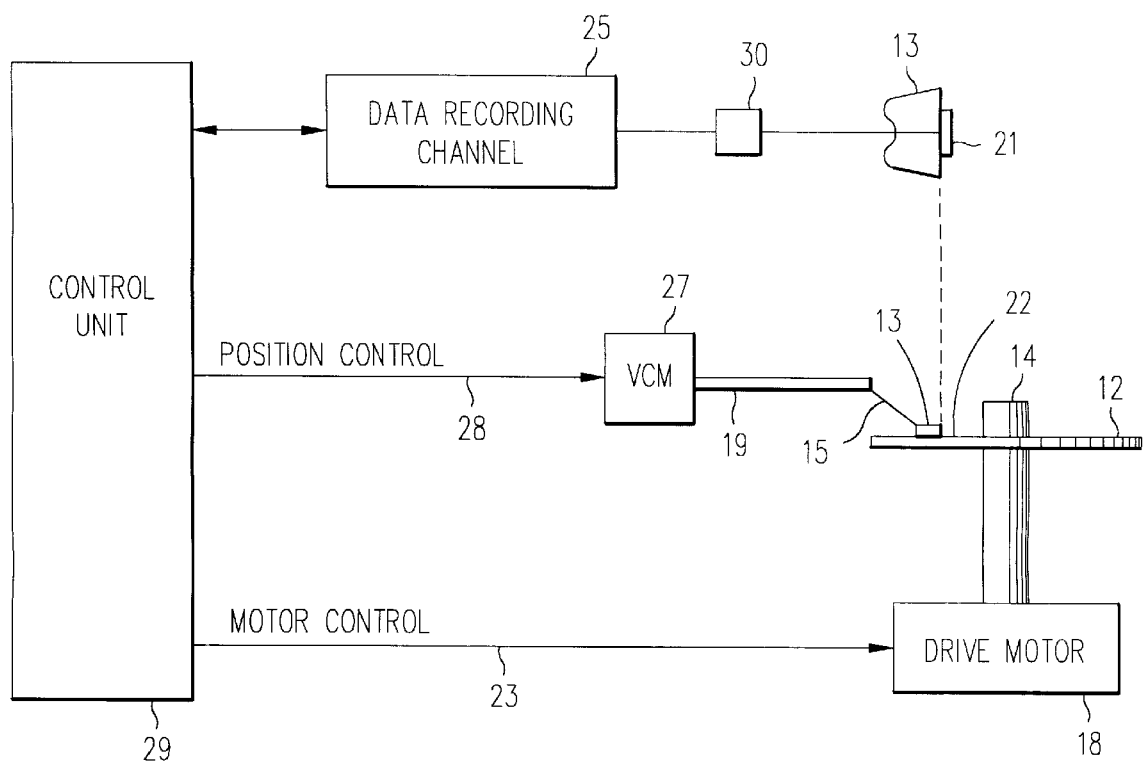
FIG. 1 is a simplified perspective drawing of a magnetic recording disk drive system which incorporates the present invention.

Referring now to FIG. 1, there is shown a disk drive 10 embodying the present invention. As shown in FIG. 1, at least one rotatable magnetic disk 12 is supported on a spindle 14 and rotated by a disk drive motor 18. The magnetic recording media on each disk is in the form of an annular pattern of concentric data tracks (not shown) on the disk 12.

At least one slider 13 is positioned on the disk 12, each slider 13 supporting one or more magnetic read/write heads 21. As the disks rotate, the slider 13 is moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator 27. The actuator as shown in FIG. 1 may be a voice coil motor (VCM). The VCM comprises a coil movable within a fixed magnetic field, the direction and speed of the coil movements being controlled by the motor current signals supplied by a controller 29.

During operation of the disk drive system 10, the rotation of the disk 12 generates an air bearing between the slider 13 (the surface of the slider 13 which includes the head 21 and faces the surface of the disk 12 is referred to as an air bearing surface (ABS)) and the disk surface 22 which exerts an upward force or lift on the slider. The air bearing thus counter-balances the slight spring force of the suspension 15 and supports the slider 13 off and slightly above the disk surface by a small, substantially constant spacing during normal operation.

The various components of the disk storage system are controlled in operation by control signals generated by the control unit 29, such as access control signals and internal clock signals. Typically, the control unit 29 comprises logic control circuits, storage chips and a microprocessor. The control unit 29 generates control signals to control various system operations such as drive motor control signals on line 23 and head position and seek control signals on line 28. The control signals on line 28 provide the desired current profiles to optimally move and position the slider 13 to the desired data track on the disk 12. Read and write signals are communicated to and from the read/write heads 21 by the recording channel 25. Recording channel 25 may be a partial response maximum likelihood (PMRL) channel or a peak detect channel. The design and implementation of both channels are well known in the art and to persons skilled in the art. In the preferred embodiment, recording channel 25 is a PMRL channel.

The above description of a typical magnetic disk drive system, and the accompanying illustration of FIG. 1 are for representation purposes only. It should be apparent that disk drive systems may contain a large number of disks and actuators, and each actuator may support a number of sliders.

Figure 2:
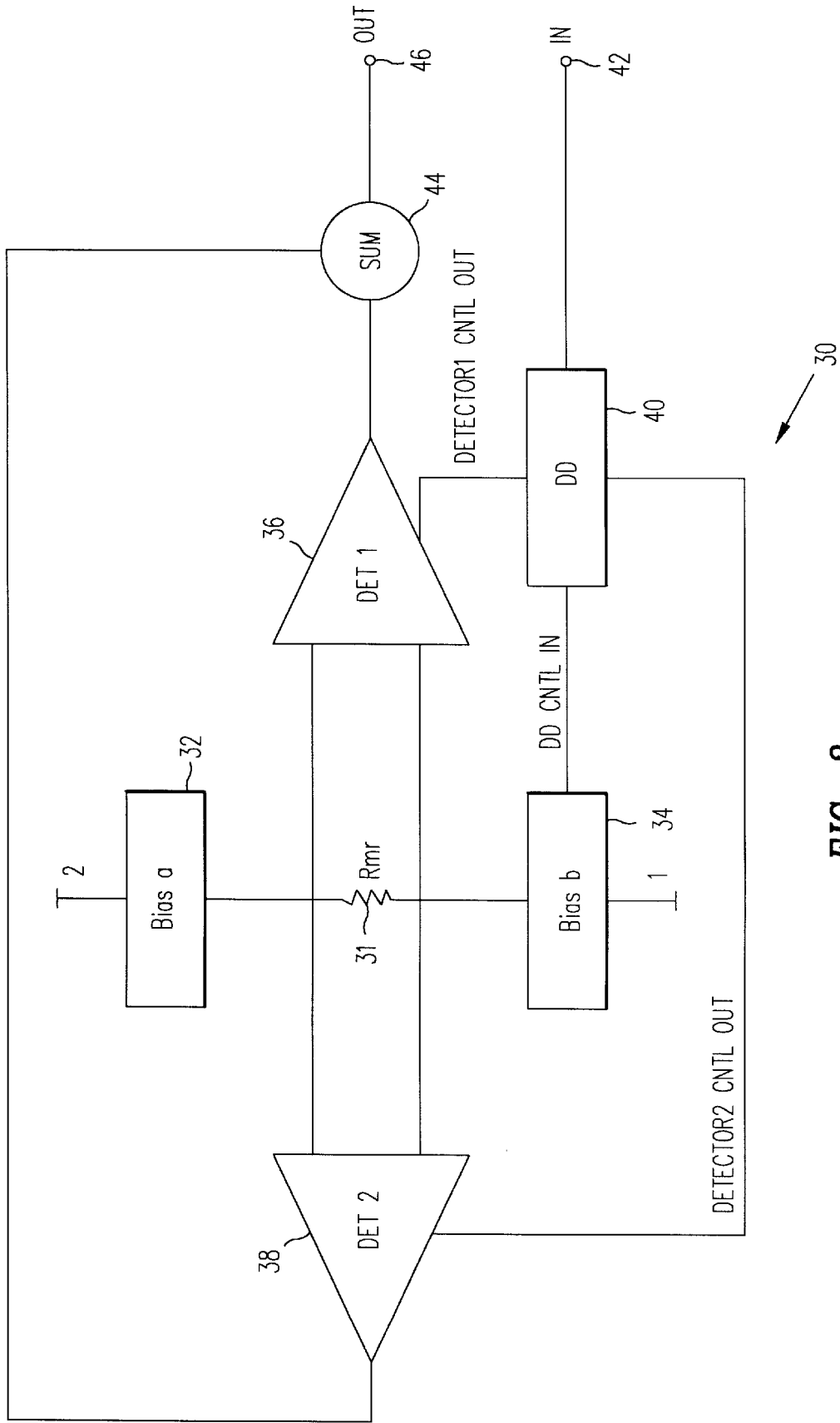
FIG. 2 is a block diagram of a multi-state preamplifier in accordance with the present invention.

Reference is now made to FIG. 2, which shows a block diagram of a multi-state preamplifier 30 in accordance with the present invention. An MR element $R_{mr}$ 31 is biased by a first bias BIASa 32 and a second bias BIASb 34. Although voltage bias is the preferred method of biasing MR or GMR elements, current bias or some other bias method could also be used. A first detector DET1 36 and a second detector DET2 38 are voltage-sense and current-sense preamplifiers, respectively. Either DET1 36 or DET2 38 is switched (switching not shown) active at any given time, producing an amplified signal representing either the signal voltage developed across the head or the signal current generated through the head, respectively. The switching process to activate either DET1 36 or DET2 38 is carried out by a detector determining circuit DD 40 connected to a disk drive control unit 29 by an input line 42. A common output from the detectors is obtained by multiplexing the individual signal representations from DET1 36 and DET2 38 by a summing circuit SUM 44 to a signal output line 46.

In the preferred embodiment, the detector determining circuit DD 40 comprises a logic circuit preferably on the AE module located on the actuator. The logic circuit includes memory registers, or alternatively an electronic look-up table or a small memory array preferably located on the AE module. Alternatively, the the memory registers may be located on the control unit 29 or even on the disk 12, however location on the AE module is advantageous since it results in faster response time and therefore increased disk drive performance.

Figure 3A:
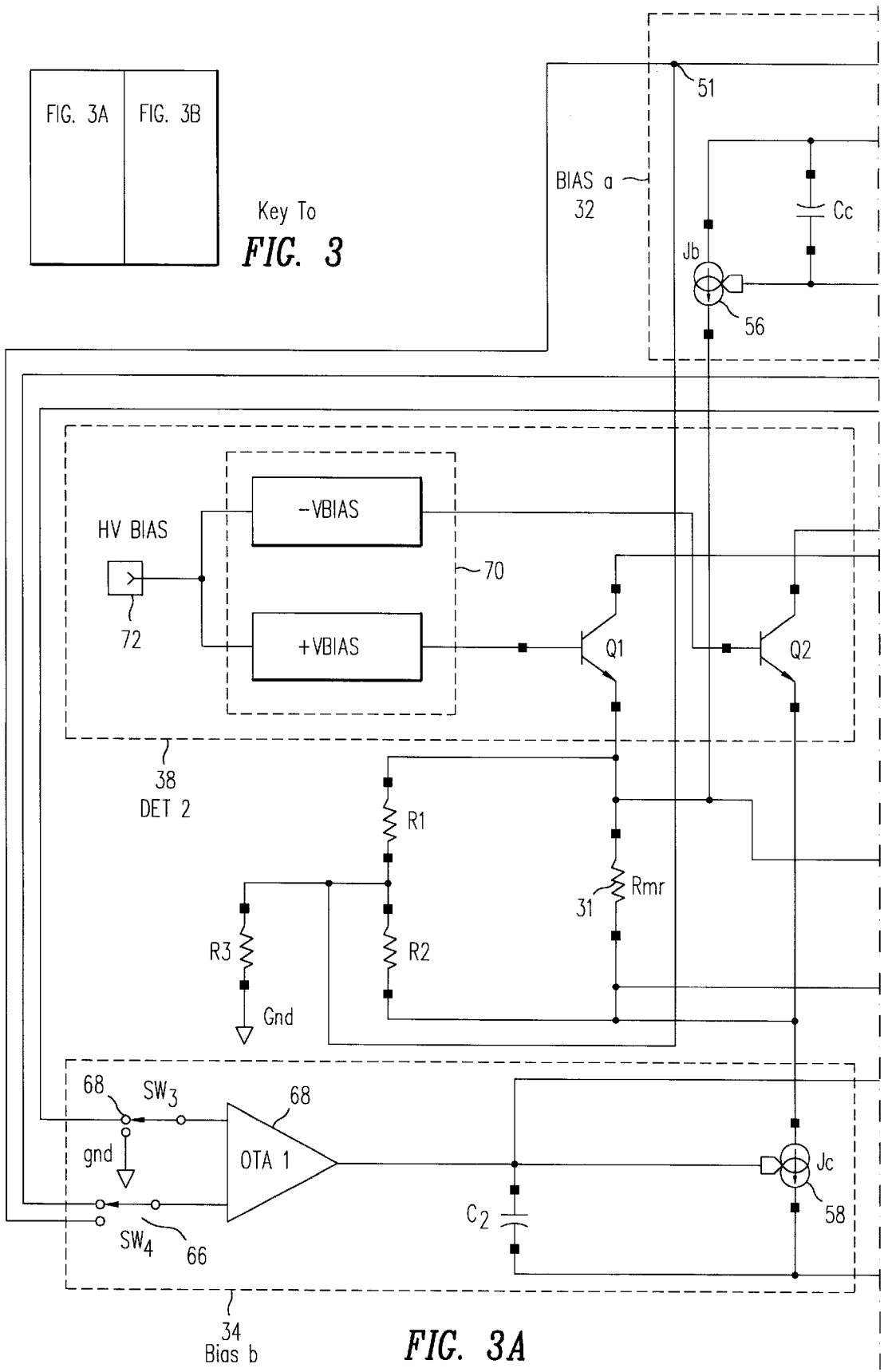
FIG. 3 is a circuit diagram of a multi-state preamplifier in accordance with the present invention.
Figure 3B:
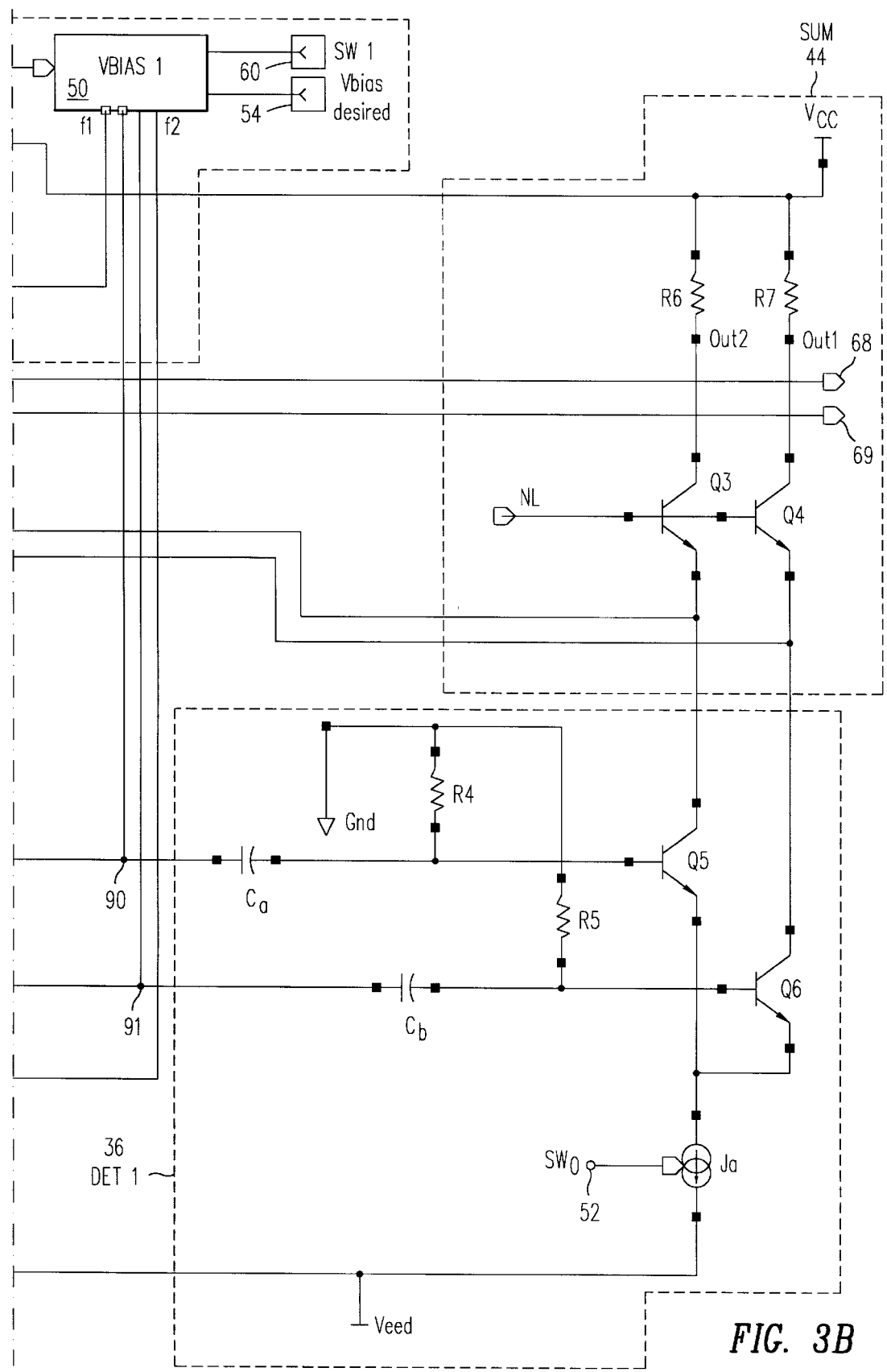

FIG. 3 shows a more detailed diagram of the circuitry represented by the block diagram depicted in FIG. 2. In FIG. 3, the MR element is again shown as $R_{mr}$ 31. The first detector DET1 36 comprises bypass capacitors $C_a$ and $C_b$, base resistors $R_4$ and $R_5$, input devices $Q_a$ and $Q_b$ (here shown as bipolar devices), and current source $J_a$. The bypass capacitors $C_a$ and $C_b$ isolate the large DC voltage ($V_{rmr}$), generated by a voltage supply VBIAS1 50, which serves to bias the MR element $R_{mr}$ 31 into the proper operating region. The current source $J_a$ serves to bias the input devices $Q_a$ and $Q_b$ and includes a switch/control SWa 52. A differential output current developed through the collectors of the input devices $Q_a$ and $Q_b$ is an amplified version of the signal voltage developed across the MR element $R_{mr}$ 31, and would be equivalent to the output of the DET1 36 of FIG. 2. The switching signal at SWa 52 is used to activate the DET1 when a voltage-sensed signal from the MR element $R_{mr}$ 31 is desired.

VBIAS1 50 serves to bias the MR element $R_{mr}$ 31 at a desired value (usually a voltage) during the operation of DET1 36. VBIAS1 may be made active or inactive by a switching signal SW1 60. $R_{mr}$ 31 is connected to a split parallel resistance, resistor $R_1$ in series with resistor $R_2$. Resistor $R_3$, connected between $R_1$ and $R_2$ and ground, serves to create a first error signal at the common connection of $R_3$ with $R_1$ and $R_2$. The first error signal is representative of the difference in potential between the electrical center of the MR element $R_{mr}$ 31 and ground. VBIAS1 50 uses this first error signal from node 51, as well as the difference between the desired MR bias value (from an input VBIAS desired 54 to VBIAS1) and the actual bias value detected from the DC potential difference between the positive first terminal at node 90 and the negative second terminal at node 91 of $R_{mr}$ 31 in providing the proper current level flowing through $R_{mr}$ 31. The difference in the DC potential between the first and second terminals of $R_{mr}$ 31 is a second error signal.

A first feedback loop and a second feedback loop coexist within VBIAS1 50. The first feedback loop detects the first error signal and develops a control signal $f_1$, and the second feedback loop detects the second error signal and develops a control signal $f_2$, providing a first mode of feedback control. Alternatively, a second mode of feedback control may be used, wherein the first error signal produces $f_2$ and the second error signal produces $f_1$ with appropriate corrections of phase and/or loop gains. In the first mode of feedback control, control signal $f_1$ is used to control the current from a controlled current source $J_b$ 56, and control signal $f_2$ is used to control the current from a controlled current source $J_c$ 58. Capacitor $C_c$ concurrently stabilizes the first feedback loop and minimizes noise from the current forced into the MR element $R_{mr}$ 31 by controlled current source $J_b$ 56. Similarly, capacitor $C_2$ concurrently stabilizes the second feedback loop and minimizes noise from the current forced from the MR element $R_{mr}$ 31 by controlled current source $J_c$ 58.

VBIAS1 50 comprises elements such as amplifiers and operational transconductance amplifiers (OTAs) as would be necessary to complete the first and second feedback loops and having proper gain levels for adequate steady-state error and low frequency rolloff when used with the capacitance values of capacitors $C_c$ and $C_2$. The design of such feedback loops is known to the art and would be known to one skilled in the art.

Alternatively, VBIAS1 50 may be implemented using a variation from the differential voltage-bias requirement described above. A single-ended voltage equal to one-half the desired voltage bias may be substituted for the completely differential voltage-bias described above.

Referring again to FIG. 2, it can be seen that BIASa 32 is used only along with the operation of DET1 36 in the voltage-sense detection mode, whereas BIASb 34 is shared between the voltage-sense detection mode and the current-sense detection mode. Therefore, for voltage-sense detection using DET1 36, switches SW1 60 and SWa 52 shown in FIG. 3 will activate VBIAS1 50 and DET1 36, respectively. During voltage-sense detection, switch HVBIAS 72 will be inactive so that DET2 38 is inactive during this time. The controlled current source $J_c$ 58 and the capacitor $C_2$ are shared between the operation of DET1 36 for voltage-sense detection and the the operation of DET2 38 for current-sense operation. An operational transconductance amplifier OTA1 68 provides control signals to the controlled current source $J_c$ 58. For voltage-sensing detection using DET1 36, the inputs of OTA1 68 are switched by switches SW3 64 and SW4 66 to ground and to the first error signal at node 51, respectively.

In order to minimize steady-state error, such that loop gains can be made as low as possible in order to utilize the smallest values of capacitances for $C_c$ and $C_2$ while maintaining specifications on low frequency rolloff, feedforward currents can be included at appropriate nodes in this circuit (not shown).

The second detector circuit DET2 38 comprises input devices $Q_1$ and $Q_2$ (shown here as bipolar devices), a differential bias network 70 comprising a negative biasing source −VBIAS and a positive biasing source +VBIAS and a bias control HVBIAS 72. The second detector circuit DET2 38 may be activated by the bias control HVBIAS 72 when a current-sense detection mode of the signal from the MR element $R_{mr}$ is desired. The differential bias network 70 keeps the MR element $R_{mr}$ 31 biased at a predetermined voltage level equal to the absolute value of the sum of +VBIAS and −VBIAS. Moreover, since both halves of the differential bias network 70 are referenced to ground, the electrical center of the MR element $R_{mr}$ 31 is kept at or near ground potential. In the current-sensing detection mode, switches SW3 64 and SW4 66 connect the differential output signal from the outputs of the summing circuit SUM 44 to the inputs of amplifier OTA1 68. A feedback loop takes the differential output signal from the summing circuit SUM 44 and applies a resultant error signal by amplifier OTA1 68 to the controlled current source $J_c$ 58. Capacitor $C_2$ serves to stabilize this feedback loop and also serves to minimize noise amplified by the 'tail' current $J_c$. A capacitor $C_1$ may also be used to reduce or eliminate noise from the differential bias network.

The summing circuit SUM 44 operates to combine the differential output signals of DET1 36 and DET2 38 into a single output signal 46 at nodes OUT1 and OUT2. A cascode pair comprising devices $Q_3$ and $Q_4$ combines these two signals using a dot-or operation at their emitters. A reference voltage $N_1$ is used to bias the bases of the cascode pair $Q_3$ and $Q_4$. The differential output signal 46 is developed across load resistors $R_6$ and $R_7$.

The use of the multi-state preamplifier 30 having DET1 36 for voltage-sensing operation and DET2 38 for current-sensing operation requires a determination of which detector should be active at a given time. The choice of the optimum detector depends on the resistance value of the MR element $R_{mr}$ 31 coupled with the input interconnect network parasitic impedances. The characteristic impedance of the interconnect network will, in general, not match either end of the interconnect, nor will its impedance be constant. Therefore it is important to properly model or measure the parasitics of the interconnect. After the parasitics have been modelled or measured, the system (interconnect, MR element and preamplifier) high frequency bandwidth variation can be determined as a function of the resistance of the MR element and possibly the port location of the MR element. In general, for lower resistance MR elements DET1 36 will yield higher bandwidth, and for higher resistance MR elements DET2 38 will yield higher bandwidth. Thus a resistance R may be chosen so that DET1 will be used if the resistance of the MR element is less than R and DET2 will be used if the resistance of the MR element is greater than R.

Several voltages and currents within DET1 36 and DET2 38 are proportional to the value of the resistance of the MR element $R_{mr}$ 31 since both detectors use feedback to bias the MR element. For example, current $J_c$ in the operation of DET1 36 is proportional to the resistance of the MR element 31. Current $J_c$ in the operation of DET2 38 is also proportional to the resistance of the MR element 31. The current $J_c$ can be mirrored into a smaller current $J_c'$ which will also be proportional to the resistance of the MR element. The current $J_c'$ can serve as the input signal to a detection determining circuit DD 40. Initially, DET1 36 may be chosen to be operational. The current $J_c'$ is compared with a predetermined threshold value in the DD 40. If the current $J_c'$ is smaller than the threshold value, DET1 36 will continue to operate as the optimum detection mode. When the current $J_c'$ becomes greater than the threshold value, the DD 40 causes DET2 38 to be made active and DET1 36 to be made inactive.

Figure 4:
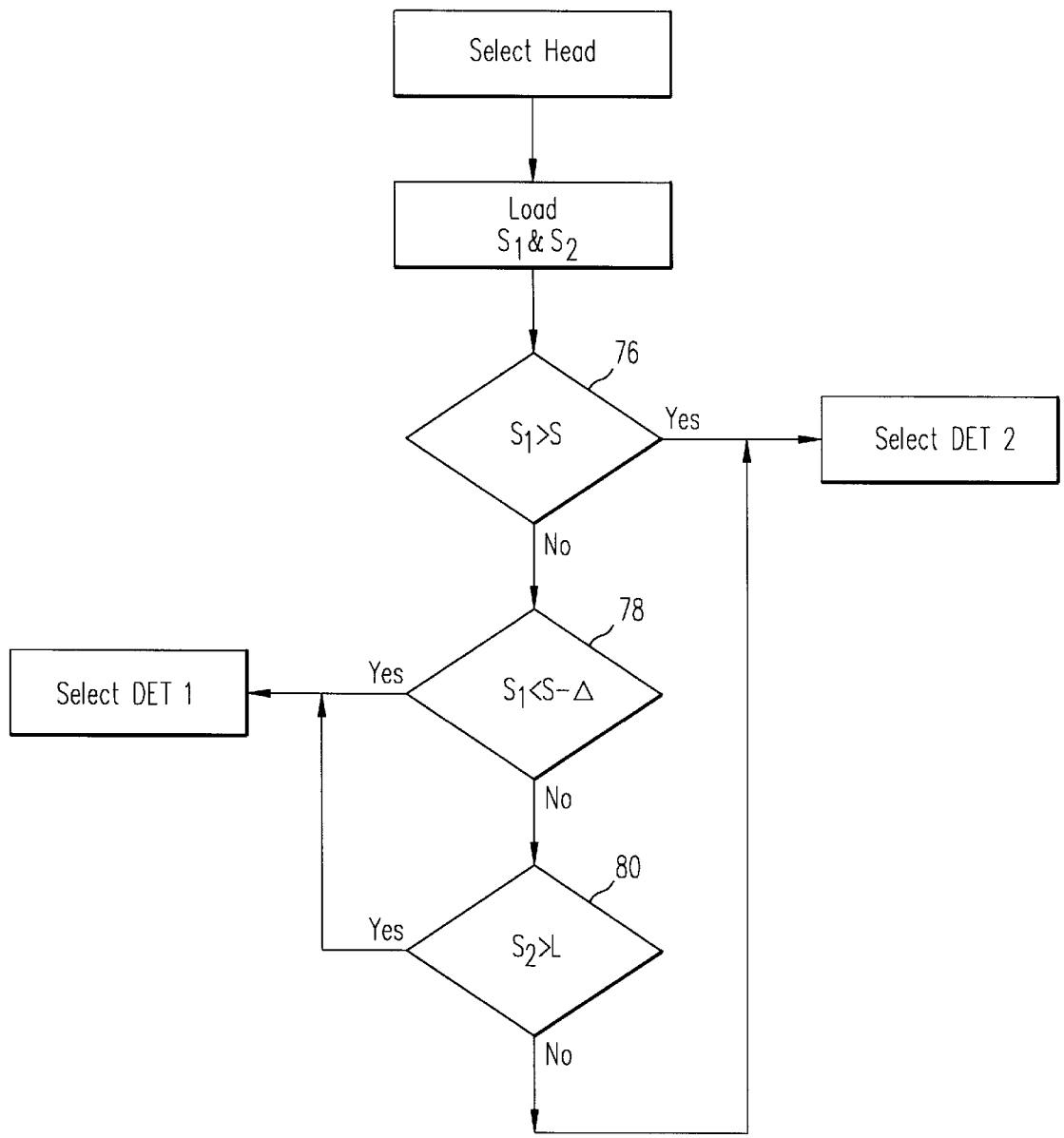
FIG. 4 is a flow diagram illustrating a method of choosing the detection mode giving the best high frequency bandwidth performance of the preamplifier.

FIG. 4 is a flow diagram illustrating a method of using the detector determining circuit DD 40 for determining which detector to select for optimum performance. Optimum signal detection depends on the high frequency bandwidth which will be a function of the MR element resistance $R_{mr}$, the interconnect length $L_i$ and the preamplifier input impedance $Z_i$. Prior knowledge of the effects of $R_{mr}$, $L_i$ and $Z_i$ on the high frequency bandwidth obtained by measurement or modeling allows a threshold value S to be chosen representative of the MR element resistance above which current detection would not be used. Similarly, a threshold value L may be chosen representative of the interconnect length above which current detection would not be used. The threshold values S and L will be compared with corresponding signal values $S_1$ and $S_2$, respectively, representing the values determined for a selected head 21 in a disk drive 10. Signal values $S_1$ and $S_2$ for each head in the disk drive 10 may be determined and stored in a memory register or look-up table during an initialization process after the file is assembled. The signal values $S_1$ and $S_2$ may be updated periodically to account for changes of the MR element resistance by rerunning the initialization process.

Referring to FIG. 4, the decision process for choosing the voltage-sensing or the current-sensing mode for the multi-state preamplifier begins with a select head process started by the control unit 29 during normal operation of disk drive 10 causing stored values $S_1$ and $S_2$ for the selected head being loaded in the logic circuit of the DD 40. A first comparator 76 compares the value $S_1$ with the threshold value S representing the MR element resistance threshold. If $S_1$ is greater than S, a signal is generated to select DET2 and the current-sensing mode of the multi-state amplifier is enabled. If $S_1$ is not greater than S, a second comparator 78 compares $S_1$ with S-$\Delta$, where $\Delta$ is a stored value representing a range of uncertainty in S in choosing the voltage-sensing or the current sensing mode. If $S_1$ is less than S-$\Delta$, a signal is generated to select DET1 and the voltage-sensing mode of the multi-state amplifier is enabled. If $S_1$ is not less than S-$\Delta$, a third comparator 80 compares $S_2$ with the threshold value L representing the interconnect length threshold. If $S_2$ is greater than L, a signal is generated to select DET1 and the voltage-sensing mode of the multi-state amplifier is enabled. If $S_2$ is not greater than L, a signal is generated to select DET2 and the current-sensing mode of the multi-state amplifier is enabled. The above process provides a method for selecting the voltage-sensing or the current-sensing mode of operation that optimizes the high frequency bandwidth performance of the multi-state preamplifier.

Alternatively, a process for selecting which detector to select without having prior knowledge of the effects of $R_{mr}$, $L_i$ and $Z_i$ on the high frequency bandwidth may be used. According to this process, a first segment of a data track on a disk surface is written at a first frequency $f_1$ and a second segment of the data track is written at a second frequency $f_2$, where the second frequency $f_2$ is greater than the first frequency $f_1$. With the multi-state preamplifier in the voltage-sensing mode (using DET1), the selected MR element is used to read the data on the first segment at frequency $f_1$ and then to read the data on the second segment at frequency $f_2$. The amplitude $A_{f1}$ of the preamplifier output signal at frequency $f_1$ and the amplitude $A_{f2}$ of the preamplifier output signal at frequency $f_2$ are compared and a first amplitude difference $\Delta A = A_{f1} - A_{f2}$ is recorded for the voltage-sensing mode. Now, with the multi-state preamplifier in the current-sensing mode (using DET2), the MR head is used to reread the data on the first segment at frequency $f_1$ and on the second segment at frequency $f_2$. The amplitudes $A_{f1}'$ and $A_{f2}'$ of the preamplifier output signals at frequencies $f_1$ and $f_2$, respectively, are compared and a second amplitude difference $\Delta A' = A_{f1}' - A_{f2}'$ is recorded for the current-sensing mode.

The amplitude differences $\Delta A$ and $\Delta A'$ for the voltage-sensing and current-sensing modes, respectively, are compared and if $\Delta A$ is less than $\Delta A'$, implying a smaller high frequency amplitude rolloff for voltage-sensing, the voltage-sensing mode using DET1 is assigned to be used with the selected MR element. If ΔA' is smaller than ΔA, implying a smaller high frequency amplitude rolloff for current-sensing, the current-sensing mode using DET2 is assigned to be used with the selected MR element.

Each MR element in the disk drive is similarly tested by the control unit 29 and a sensing mode is assigned to each MR element that provides the highest high frequency rolloff output amplitude of the preamplifier. A lookup table is generated preferably on the AE module, or alternatively in the control unit or on the disk, to permanently assign the high frequency detection mode to be used for each MR element in the disk drive. The lookup table may be updated at any time by rerunning the above selection process.

Typically pre-knowledge of the interconnect characteristics is not well-modeled. Therefore, the ability to change the detection characteristics after the disk drive has been assembled is an important advantage of the multi-state preamplifier of the present invention. The high frequency bandwidth of the amplifier system is constrained primarily by the MR element/interconnect/preamplifier interface. Changing the preamplifier input impedance is the most effective way to improve the bandwidth after the disk drive is assembled. The multi-state preamplifier of the present invention provides a method for attaining the broadest range of imput impedance and therefore provides the most effective means to improve the system high frequency bandwidth.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A preamplifier for a magnetic recording disk drive, comprising:
   a first detector having input leads for connection with a magnetoresistive (MR) element, said first detector providing voltage-sense detection and amplification of a magnetic readback signal from the MR element at output leads of the first detector;
   a second detector having input leads for connection with the MR element, said second detector providing current-sense detection and amplification of a magnetic readback signal from the MR element at output leads of the second detector; and
   a detector determining circuit connected to said first and second detectors and responsive to a disk drive control unit signal, said detector determining circuit providing switching signals to enable and disable the first and second detectors.

2. The preamplifier for a magnetic recording disk drive as recited in claim 1, wherein the first detector comprises a differential preamplifier having a current source for biasing.

3. The preamplifier for a magnetic recording disk drive as recited in claim 1, wherein the second detector comprises a differential preamplifier having a voltage source for biasing.

4. The preamplifier for a magnetic recording disk drive as recited in claim 1 further comprising a sum circuit connected to an output of the first detector and to an output of the second detector, said sum circuit providing a single output from the first detector and the second detector.

5. The preamplifier for a magnetic recording disk drive as recited in claim 1 further comprising a first bias circuit connectable to a first terminal of the MR element, said first bias circuit comprising a current source and a voltage source having feedback loops to control a current flowing to the MR element from the current source.

6. The preamplifier for a magnetic recording disk drive as recited in claim 1 further comprising a second bias circuit, said second bias circuit comprising a current source connectable to a second terminal of the MR element, and an operational transconductance amplifier connected to the current source to control current flowing to the MR element.

7. A preamplifier for a magnetic recording disk drive comprising:
   a means for selecting a current-sensing mode of the preamplifier when a value representing a resistance of a selected MR element is greater than a threshold value of the resistance of an MR element; and
   a means for selecting a voltage-sensing mode of the preamplifier when the value representing the resistance of the selected MR element is not greater than the threshold value of the resistance of an MR element.

8. A preamplifier for a magnetic recording disk drive comprising:
   a means for selecting a current-sensing mode of the preamplifier when a value representing a resistance of a selected MR element is greater than a first threshold value;
   a means for selecting a voltage-sensing mode of the preamplifier when the value representing the resistance of the selected MR element is less than the first threshold value less a value representing a range of uncertainty of said first threshold value;
   a means of selecting the voltage-sensing mode when the value representing the resistance of the selected MR element is not less than the first threshold value less the value representing a range of uncertainty of said first threshold value and, a value representing an impedance of an interconnect line coupled to the selected MR element is greater than a second threshold value; and
   a means of selecting the current-sensing mode when the value representing the resistance of the selected MR element is not less than the first threshold value less the value representing a range of uncertainty of said first threshold value and, the value representing an impedance of the interconnect line coupled to the selected MR element is not greater than the second threshold value.

9. A method of selecting a preamplifier mode for a magnetic recording disk drive comprising the steps of:
   selecting a current-sensing mode of the preamplifier when a value representing a resistance of a selected MR element is greater than a threshold value of the resistance of an MR element; and
   selecting a voltage-sensing mode of the preamplifier when the value representing the resistance of the selected MR element is not greater than the threshold value of the resistance of an MR element.

10. A method of selecting a preamplifier mode for a magnetic recording disk drive comprising the steps of:
   selecting a current-sensing mode of the preamplifier when a value representing a resistance of a selected MR element is greater than a first threshold value;
   selecting a voltage-sensing mode of the preamplifier when the value representing the resistance of the selected MR element is less than the first threshold value less a value representing a range of uncertainty of said first threshold value;

selecting the voltage-sensing mode when the value representing the resistance of the selected MR element is not less than the first threshold value of less the value representing a range of uncertainty of said first threshold value and, a value representing an impedance of an interconnect line coupled to the selected MR element is greater than a second threshold value; and selecting the current-sensing mode when the value representing the resistance of the selected MR element is not less than the first threshold value less the value representing a range of uncertainty of said first threshold value and, the value representing an impedance of the interconnect line coupled to the selected MR element is not greater than the second threshold value.

11. A method for choosing a voltage-sensing or a current-sensing mode for a preamplifier for a magnetic recording disk drive comprising the steps of:

loading values representing a resistance of a selected MR element and an impedance of an interconnect line coupled to the selected MR element;

comparing the value representing resistance of the selected MR element with a first threshold value;

selecting the current-sensing mode when the value representing resistance of the selected MR element is greater than the first threshold value;

comparing the value representing resistance of the selected MR element with the first threshold value less a value representing a range of uncertainty of said first threshold value when the value representing resistance of the selected MR element is not greater than the first threshold value;

selecting the voltage-sensing mode when the value representing resistance of the selected MR element is less than the first threshold value less the value representing a range of uncertainty of said first threshold value;

comparing the value representing an impedance of the interconnect line coupled to the selected MR element with a second threshold value when the value representing resistance of the selected MR element is not less than the first threshold value less the stored value representing a range of uncertainty of said first threshold value;

selecting the voltage-sensing mode when the value representing the impedance of the interconnect line coupled to the selected MR element is greater than the second threshold value; and selecting the current-sensing mode when the value representing the impedance of the interconnect line coupled to the selected MR element is less than the second threshold value.

12. A method for choosing a voltage-sensing or a current-sensing mode for a preamplifier for a magnetic recording disk dive comprising the steps of:

selecting a read/write head having a write element and an MR element for reading and a corresponding data track on a disk surface;

writing a magnetic signal on a first segment of the data track with the write element at a first frequency and writing a magnetic signal on a second segment of the data track with the write element at a second frequency, wherein the second frequency is higher than the first frequency;

switching the preamplifier to the voltage-sensing mode;

reading, with the MR element, the first segment of the data track at the first frequency to obtain a first amplitude of an output signal from the preamplifier, and reading, with the MR element, the second segment of the data track at the second frequency to obtain a second amplitude of an output signal from the preamplifier, and recording a first amplitude difference representing the difference between said first amplitude and said second amplitude read in the voltage-sensing mode;

switching the preamplifier to the current-sensing mode;

reading, with the MR element, the first segment of the data track at the first frequency to obtain a first amplitude of an output signal from the preamplifier, and reading, with the MR element, the second segment of the data track at the second frequency to obtain a second amplitude of an output signal from the preamplifier, and recording a second amplitude difference representing the difference between said first amplitude and said second amplitude read in the current-sensing mode;

comparing the first amplitude difference and the second amplitude difference to determine the sensing mode having a smaller value of the amplitude difference;

assigning the sensing mode having the smaller value of the amplitude difference as an assigned sensing mode for the selected MR element; and recording the assigned sensing mode for the selected MR element.

* * * * *